Patented July 21, 1931

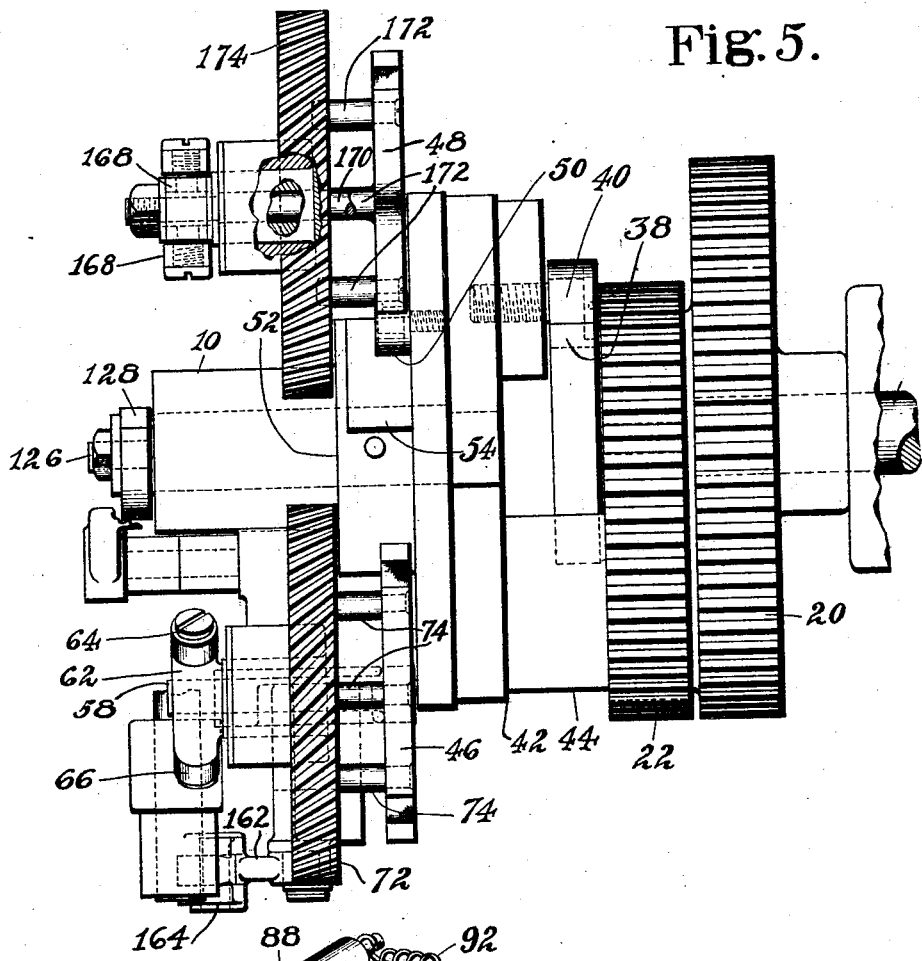
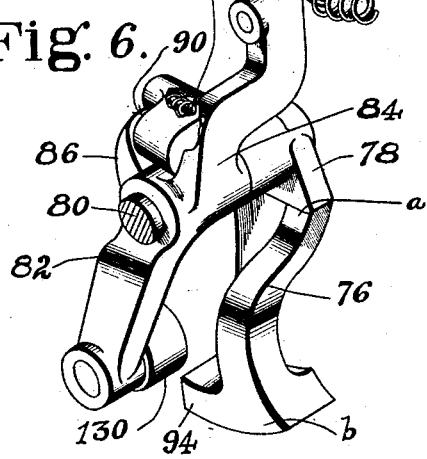

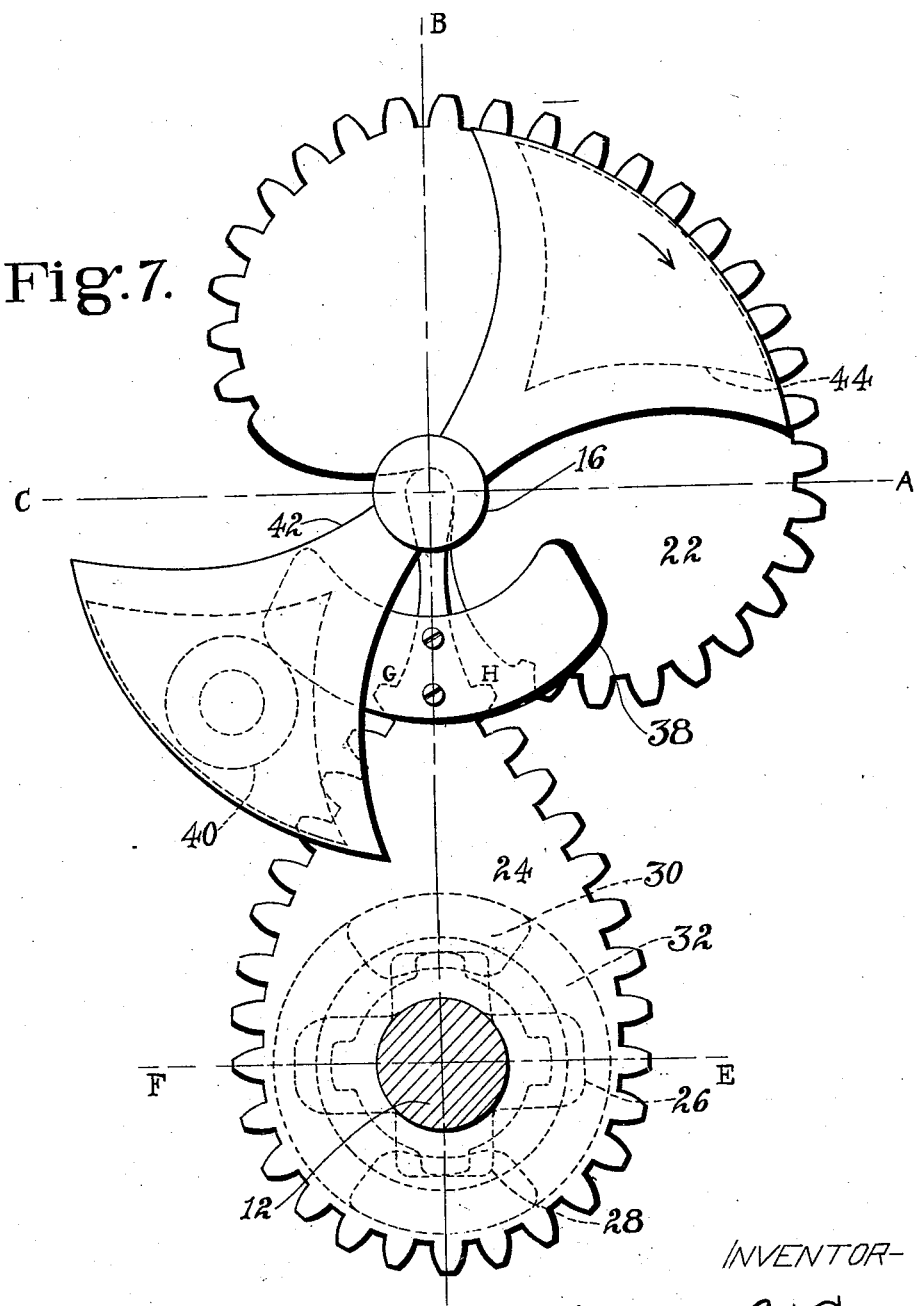

1,815,289

UNITED STATES PATENT OFFICE

GARRETT P. S. CROSS, OF GRAND RAPIDS, MICHIGAN, ASSIGNOR TO UNITED SHOE MACHINERY CORPORATION, OF PATERSON, NEW JERSEY, A CORPORATION OF NEW JERSEY

CONTROLLING SYSTEM

Application filed February 9, 1925. Serial No. 7,944.

This invention relates to controlling systems, for example, those which vary the connection between a driving and a driven member. It is more particularly designed for applying this variation of connection to changing the speed of a shaft driven from another shaft, as by starting and stopping the driven shaft.

A condition not infrequently encountered in machines to which power is to be applied is one in which an operation should be started and stopped at predetermined points in the machine-cycle. To control such action, it is customary to employ, between the source of power and the driven member, frictional connections combined with a positive stop device, the latter exerting its effect after said member has been slowed frictionally. The results attained by a system of this character are often unsatisfactory. The friction generates heat, and this produces energy losses. The contact portions wear rapidly, and must therefore be adjusted or renewed. Moreover, as the speed of the source of power or that of the machine varies, adjustment is required to give uniformity. Then, too, there is always a more or less objectionable shock as the stop acts. An object of this invention is to provide means whereby the connection and disconnection may be so controlled that the starting and stopping of a driven member will unfailingly occur at definite points in the cycle, the change being effected positively, without waste of power and without impact.

In the accomplishment of this object, I utilize, as a feature of the invention, an apparatus interposed between the driving and driven members, and arranged for engagement and disengagement to positively connect said members and to disconnect them and to stop said driven member in a predetermined position. This apparatus is preferably automatic, its controlling action being initiated through means governed by an operator. The driving and driven members may be shafts respectively receiving power from a source and communicating it to a machine to be operated. After disconnection, this definite position of the driven member may be temporarily held by means which is capable of release upon the application of an appropriate force. This permits a manual positioning of the machine joined to the driven member. There is included, however, means for preventing the operator from starting the automatic action of the apparatus until the driven member has been restored to its correct position. The means by which the connection between the members is varied is movable, and the rate of movement is automatically changed, as in preparation for engagement or disengagement. Preferably, there is provided between driving and driven members an intermediate element which is successively connected to such members. In the present instance, this intermediate element is shown as a gear included in variable-speed gearing and operating about the driving shaft, while clutch devices, preferably of the jaw type, serve to join this gear positively to the driving and driven members. In the connection of the members by this organization, the intermediate element, which is shown as normally rotated idly by the driving member, may have its speed reduced to that of the member to be driven, united thereto by an appropriate clutch, its speed with the driven member then accelerated to that of the driving member, and finally joined by another clutch to the driving member. In none of the changes of relation between the connection-varying elements does forcible impact occur.

A further feature of the invention concerns the control of the connection-varying means. For this purpose, there are furnished a plurality of automatic controlling mechanisms for separately actuating the connection-varying means. One of these controlling mechanisms may govern the action of another, the initiation of control, as of the first-acting mechanism, being at the will of the operator. Each controlling mechanism, whatever the member employed, may be acted upon by a member traveling under the influence of the driving member, the mechanism thus actuated having an element moving into and out of the path of the traveling member to receive its effect. Herein I have illustrated a controlling apparatus, the mechanisms of which include a member intermittently rotated from the driving member. Preferably, this controlling member consists of a gear of the Geneva type, and it may be actuated by a projection revoluble by the driving member. The controlling mechanisms serve to alter the relations of the connection-varying means, as by shifting the variable-speed gear and similarly operating the clutch devices. One of the mechanisms may also be utilized to initiate the action of an associated controlling mechanism, and also to cause cessation of its own action.

Other features leading, for example, to completeness of control, certainty of effect and simplicity of structure, will be developed in the detailed description and defined in the claims.

In the accompanying drawings illustrating a particular embodiment of my invention, Fig. 1 represents the improved controlling system in side elevation, showing the elements as they are related while effecting the connection of the driving and driven members;

Fig. 5 is a broken top plan view of the system;

Fig. 6 shows, in perspective, the controlling levers for the primary Geneva gear; and Fig. 7 illustrates the change-speed gearing in elevation.

Figure 3:
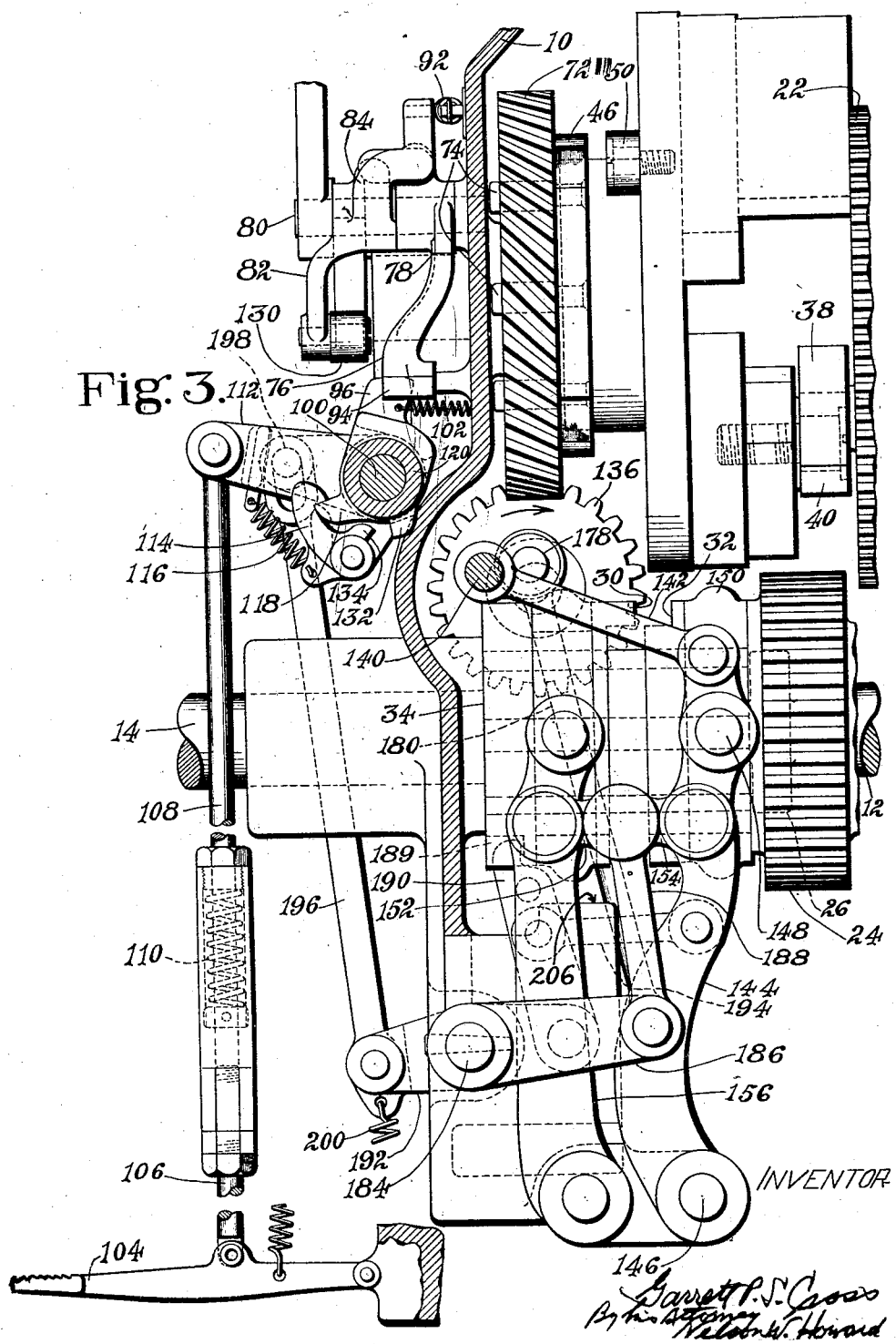
Fig. 3 is a broken elevation similar to Fig. 1, but with the elements inactive, as at the completion of its connecting or disconnecting operation.

Rotatable in a frame 10 is a power-shaft 12, constantly driven, and an alined shaft 14, which is to receive power from the shaft 12 for the operation of a machine not illustrated. Journaled parallel to the shafts 12 and 14 is a counter-shaft 16, connected to the shaft 12 by constant-speed gearing consisting of two-to-one reduction-gears 18 and 20. The shaft 16 also carries fast upon it a gear 22, the form of which is best shown in Fig. 7. It has 90 degrees of its periphery from A to B concentric with the axis of the shaft 16; then a lobe of 90 degrees from B to C, of gradually decreasing radius; a portion of 90 degrees from C to D, from which the teeth are omitted and which, having a pitch radius of zero, produces no rotative effect; and finally a lobe of 90 degrees from D to A, of gradually increasing radius. With this gear 22 co-operates a gear 24 surrounding the shaft 12, and which, in the normal or nonoperating condition of the controlling system, is out of mesh with the gear 22, being located at the left thereof, as is illustrated in Fig. 3 of the drawings, and then in rotative engagement with the shaft 12 by means of a depression 26 in its hub, which receives projections 28 upon the shaft. The gear 24 may be carried to the right into mesh with the gear 22, to produce the desired changes in speed which will hereinafter be described, it at this time being free from connection with the shaft 12 and turning about it. It may be united with the machine-shaft 14 by members 30 and 32 of a jaw-clutch. These are respectively carried by a sleeve 34 splined at 36 to an enlargement of the shaft 14, and by the hub of the gear 24. For meshing with the quadrant A, B of the gear 22, the gear 24 has a corresponding toothed portion E, F of uniform radius; a toothed portion F, G of gradually increasing radius co-operates with the lobe B, C of the gear 22; a projecting portion between G and H, which is without teeth, enters the depression C, D in the gear 22 to give a period of rest; and a portion H, E of gradually decreasing radius engages the lobe of the gear 22 from D to A. It will be noted that the gear 24 is, at one period of its action under the influence of the gear 22, free to rotate out of mesh with the latter under the influence of gravity, unless otherwise controlled, this being at the time illustrated in Fig. 7 of the drawings, when the projection between G and H of the gear 24 is in the depression of the gear 22. To prevent this, there is attached to the inner face of the gear 24 an arcuate projection 38, the outer edge of which moves in contact with a roll 40 fixed upon the opposed face of a plate 42 carried parallel to the gear 22 by a projection 44 therefrom. Contact between these elements 38 and 40 holds the gear 24 against rotation in an anti-clockwise direction, as viewed in Fig. 7, during the period of possible disengagement.

Figure 1:
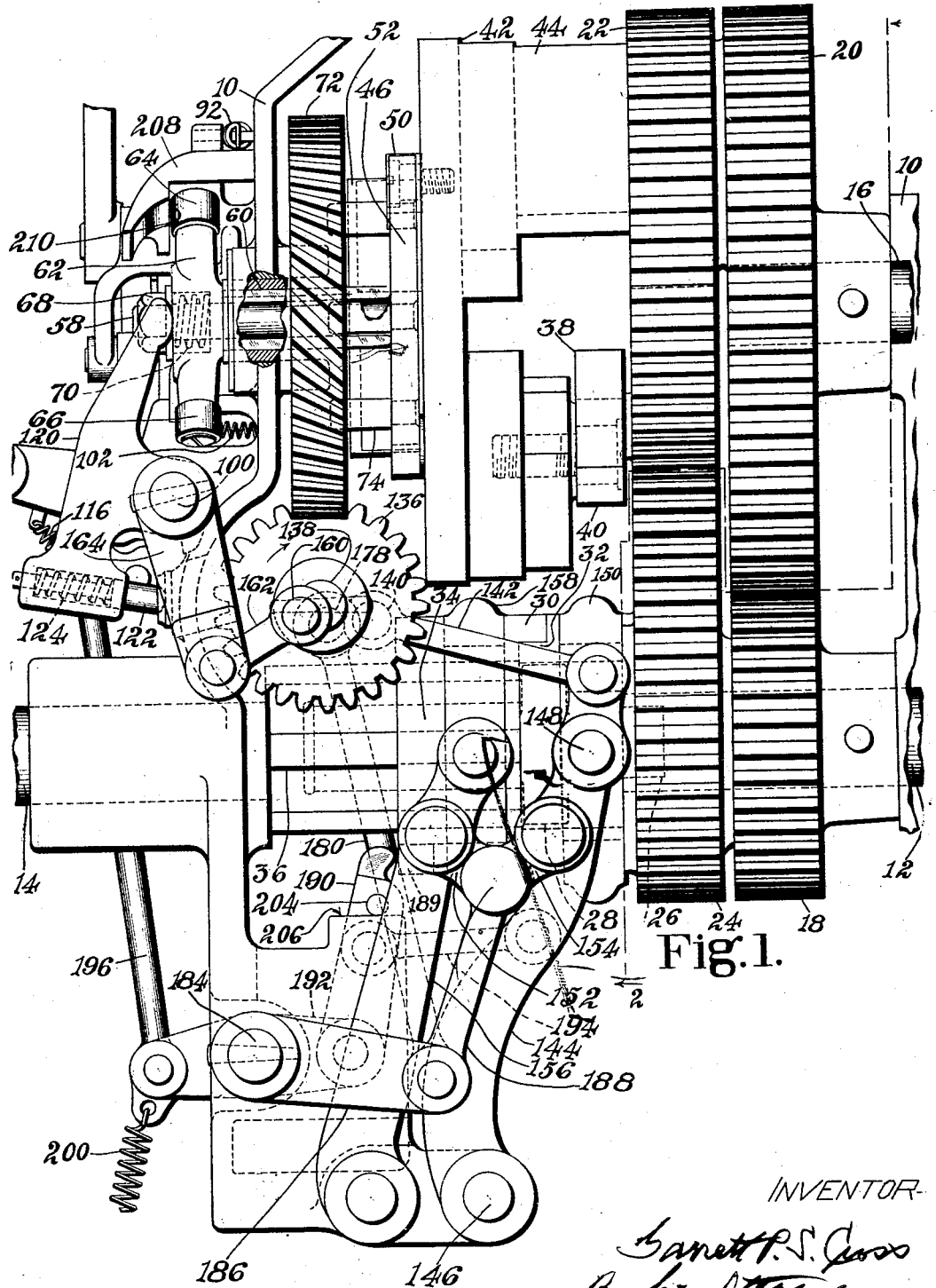
Figure 2:
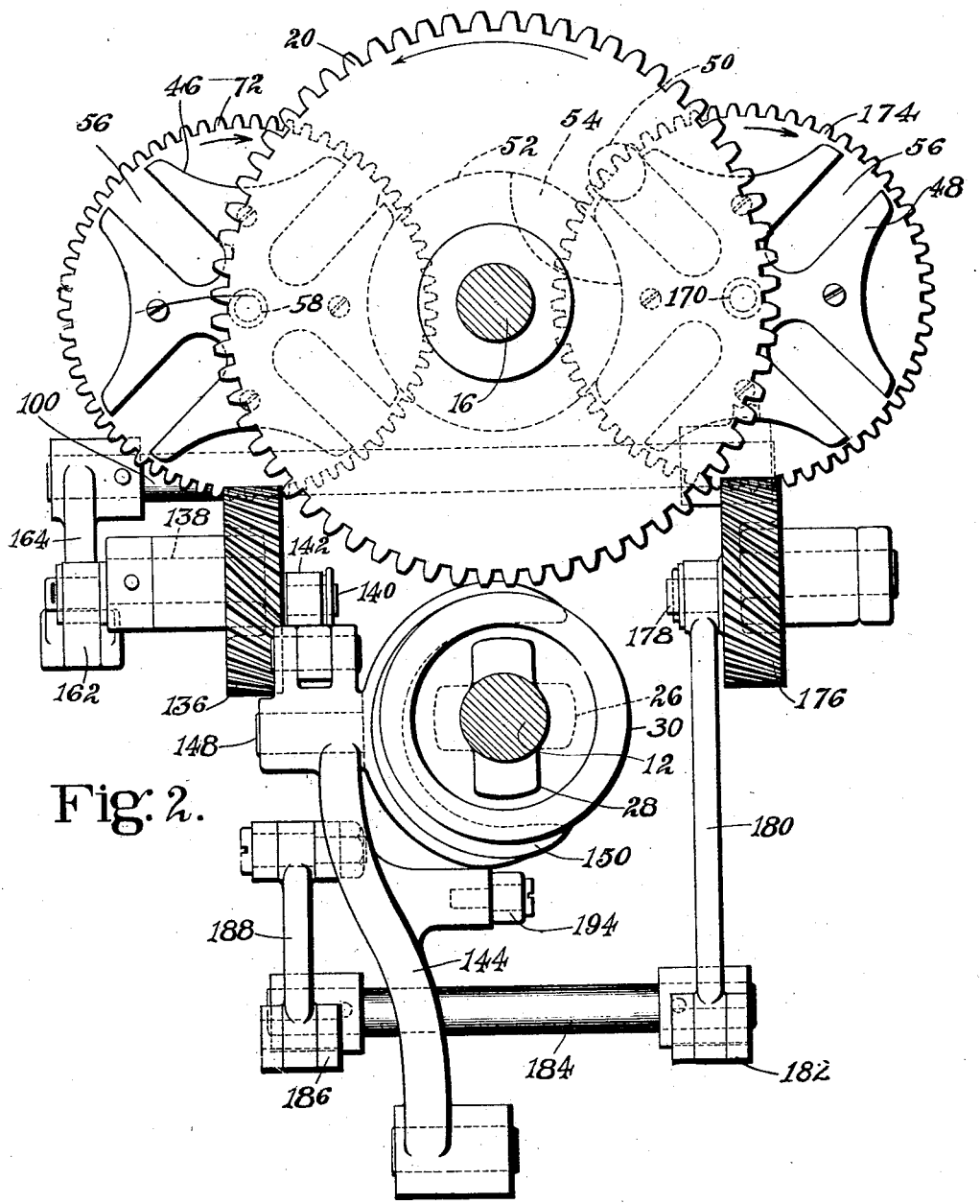
Fig. 2 is a vertical section on the line 2—2 of Fig. 1, many elements being omitted.

To control the lateral position of gear 24 of the variable-speed gearing and thus the relation of the clutch device furnished by the depression 26 and the projections 28, and also to govern the engagement or disengagement of the clutch members 30 and 32, there is associated with the counter-shaft 16, at opposite sides, an apparatus including two mechanisms provided with controlling devices in the form of intermittent-rotation devices, as Geneva gears 46 and 48 (Figs. 2 and 5). The former is of a primary character, governing the secondary gear 48, both being actuated by a roll 50 secured to the outer face of the plate 42. When the system is not acting to effect connection or disconnection, being so conditioned as to cause the machine controlled to be either stationary or operating, both the Geneva gears are out of the plane of the roll 50, being held against rotation by the engagement of the concave portions of their peripheries, situated 90 degrees apart, with the periphery of a hub 52 upon the plate 42. This hub contains a recess 54 permitting intermittent rotation of the Geneva gears when the roll 50 enters their radial slots 56, these slots being spaced uniformly in the usual manner, 90 degrees apart between the hub-engaging depressions. The gear 46 is secured upon a shaft 58, which is mounted in a sleeve 60 (Fig. 1) carrying at its outer end a governing member, consisting of a diametrically extending bar 62 having upon its opposite extremities rolls 64 and 66. The shaft 58 bears, threaded upon its outer end, a nut 68, and between this and the end of the sleeve 60 is interposed a helical spring 70 surrounding the shaft. The sleeve and shaft are splined to turn together, but are permitted a relative axial movement against the spring, compressing this, or in the opposite direction, as a result of the expansion of the spring. The sleeve 60 carrying the shaft 58 is journaled within the hub of a helical gear 72, this being, in turn, mounted to rotate in the frame. Pins 74, of which there may be four, projecting from the face of the Geneva gear 46 into openings in the helical gear 72, communicate rotation to the latter, while permitting some independent axial movement of the gear 46.

Figure 4:
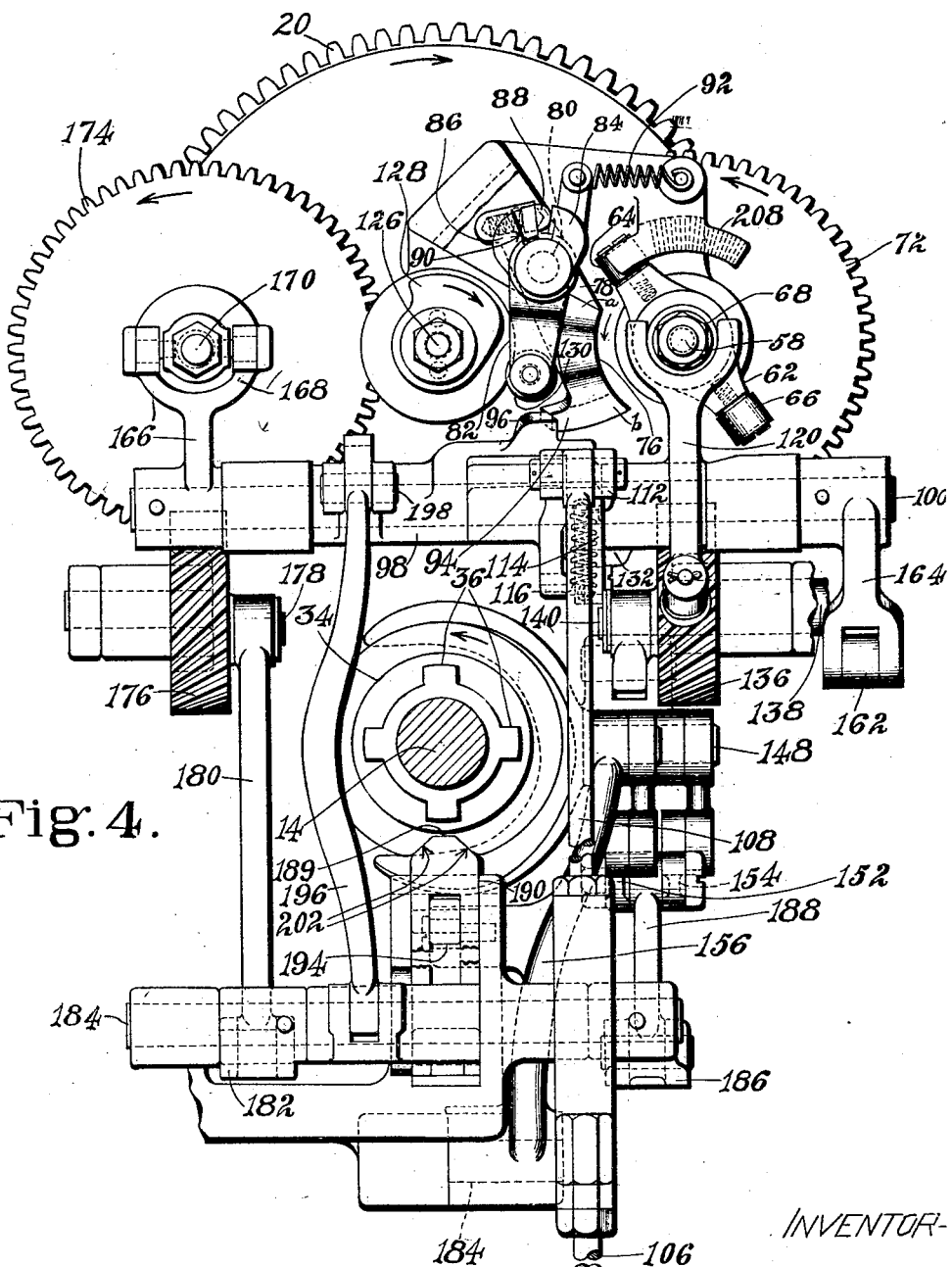
Fig. 4 is an end elevation looking from the left in Fig. 1.

Travel of the gear 46 into and out of engagement with the actuating roll 50 is controlled by a cam 76 having its surface of gradually increasing incline outwardly from a point a to a point b (Figs. 4 and 6). Over this cam the rolls 64 and 66 pass in their revolution, one of them normally resting upon the high point b to hold the controlling mechanism inactive. The cam 76 is mounted upon or made a part of a bell-crank-lever 78 pivoted to move about a spindle 80 projecting horizontally from the frame. The movement of the lever and the cam which it carries is effected through an intermediate lever 82 fulcrumed about the same axis and having lugs 84 and 86, which respectively contact with a spring-pressed contact member or plunger 88 mounted in the cam-lever 78, and with a face 90 at the opposite side of said cam-lever. A spring 92, extending between a tail of the lever 82 and the frame, exerts its tension to draw the cam-lever 78, by contact of the lug 86 with the face 90, out of the path of the rolls 64 and 66. The cam-lever is normally restrained from movement in this direction by the contact of the end of its lower extension 94 with a latch in the form of a lug 96 projecting upwardly from a sleeve 98 rotatable about a spindle 100, which extends across the frame beneath and transversely of the spindle 80 (Figs. 3 and 4). The lug 96 is moved into co-operation with the cam-lever by a tension-spring 102 joining it to the frame, while its withdrawal is governed by treadle mechanism. This mechanism may consist of a foot-lever 104 pivoted upon the frame and connected to a rod 106, 108, which has interposed between its sections a compression-spring 110. The upper end of the connecting-rod is articulated to a bell-crank-lever 112 arranged to turn about the spindle 100 adjacent to the sleeve 98. This bell-crank-lever carries, upon a depending arm, a pivoted detent 114 held by a spring 116 in yielding engagement with a projection 118 upon the member 98. The cam 76 is normally held, by engagement of the extension 94 with the lug 96, into the path of the rolls 64 and 66 against the tension of the spring 92, contact of one of said rolls with the cam-point b maintaining the Geneva gear 46 out of co-operation with the actuating roll 50. Depression of the treadle swings the lever 112 about its fulcrum, and, through the latch 114, correspondingly turns the sleeve 98 to withdraw the lug 96 from the end of the extension 94 of the cam. Thereupon, the spring 92 acts through the lever 82, projection 86 and surface 90 to carry the cam to the left, as viewed in Fig. 4, away from the engaging roll. The Geneva gear 46 is thus freed for lateral movement into co-operation with the actuating roll 50. This movement is produced by a lever 120 (Fig. 1) pivoted upon the spindle 100 and resting at one end upon the hub of the bar 62, while at the other end is a plunger 122 movable in a bore in the lever and forced against the frame by a helical spring 124 surrounding the shank of the plunger within the bore. When the roll, as 66, with its carrying bar, and the sleeve 60 and shaft 58 connecting it to the Geneva gear 46, are released by the cam, the force of the spring 124 swings the lever 120 in a clockwise direction, and shifts the gear bodily into the path of the roll 50. Upon such movement, the end of the released roll 66 is carried into alinement with the arcuate side of the lever 78 opposite the extension 94.

The release of the Geneva gear 46 by the cam 76 should only occur at such a time as the gear is in proper relation to its driving roll 50 and the space 54 in the hub 52. To guard against freeing the gear at other times by depression of the treadle 104, a cam 128 (Figs. 4 and 5) is fixed upon the end of a shaft-section 126, which furnishes an extension of the counter-shaft 16 beyond the plate 42. This cam has a circumferential enlargement so related to the slots 56 of the Geneva gear 46 that, during the period at which the gear and the roll 50 should not be permitted to engage, this surface contacts with a roll 130 upon the lever 82. With the lever thus held by the cam 128, lug 84, contacting with the plunger 88 of the cam-lever 78, serves to hold said cam-lever in its Geneva-gear-retaining position independently of the lug 96. Assuming, however, that the relation of the parts is such that the rolls 64 or 66 may properly be freed by the withdrawal of the lug 96, the lower extremity of the cam-lever is swung to the left (Fig. 4) by the spring 92 acting through the lug 86 and the surface 90. It is desired that the lug 96 shall be released for further co-operation with the cam-lever regardless of the length of time the treadle 104 is depressed, so that control by the operator shall be, temporarily nullified. For this purpose, there is carried at one side upon the lever 120, near its fulcrum, a projection 132. When the lever, under the influence of the spring 124, shifts the Geneva gear 46 into position for actuation, this projection 132 strikes a tail 134 upon the detent 114 (Fig. 3), withdrawing said detent from behind the projection 118 of the member 98 carrying the lug 96. Thus freed, the lug is first forced by the spring 102 against the side of the extension 94 of cam lever 78. This engagement of the lug with the side of the extension continues until the released roll 64 or 66, revolved by the Geneva gear in an anti-clockwise direction (Fig. 4), travels past the lower extremity of the arcuate side of the lever 78. At this time, the cam 128 acts to turn the cam-lever anti-clockwise, the plunger 88 yielding until the roll is clear of the edge of the cam as a result of its revolution. When the lever is thus freed, the force exerted by the plunger carries the extension 94 to the right, so that the lug 96 is released and is drawn by the spring 102 into alinement with the end of the lever-extension, which is not then under the influence of the cam 128. The face of the lug which contacts with the end of the extension is somewhat inclined. Consequently, under the tension of its spring 102, it will, upon engagement with the lever, which is now drawn toward it by the spring 92, somewhat force this away from the cam 128. This, through the surface 90 and lug 86, will carry the roll 130 of the lever 82 sufficiently far from the cam so that it will not be struck by the latter during its rotation. This is to avoid the disagreeable clicking which would be produced by such contact. The lever 78 is now held by the lug 96 against the tension of the spring 92 in its initial position, ready to engage the succeeding roll of the pair 64, 66 when this reaches it in its revolution, and to thereby cause, by the ascent of such roll over the cam-surface a, b, the disengagement of the Geneva gear 46 from the driving roll 50, thus terminating a cycle of operation.

In its rotation, the Geneva gear 46 performs three functions. It alternately shifts the gear 24 into and out of engagement with the gear 22, at the same time releasing the gear 24 from its engagement with the driving shaft 12 through the depression 26 and projections 28, or bringing these last-mentioned parts together to lock the gear 24 to said shaft in its inactive relation. It carries the secondary Geneva gear 48 alternately into and out of the path of the roll 50 to cause this gear 48 to be operated thereby or to remain inactive; and it shifts itself out of co-operation with the roll 50. This last result, through the action of the cam 76 upon the rolls 64 and 66, revolved by the Geneva gear 46, has just been described.

As to the lateral movement of the gear 24, the helical gear 72, rotating with the Geneva gear 46, meshes with a helical gear 136 (Fig. 1), the ratio of these gears 72 and 136 being as two to one. The gear 136 is fast upon a short shaft 138 journaled horizontally in the frame and having upon its face a crank-pin 140 connected by a link 142 to the upper extremity of a lever 144 fulcrumed at 146 upon the frame. This lever at 148 is pivoted to a yoke 150 engaging the hub of the gear 24. For each rotation of the helical gear 136 which occurs upon each 180 degrees of rotation of the Geneva gear 46, gear 24 is shifted along the shaft 12 in opposite directions, so that it is either in mesh with the gear 22, as appears in Fig. 1, or in a position to the left thereof and out of mesh, as is shown in Fig. 3, it at this time turning between the gear 22 and plate 42. In the latter relation, as has already been indicated, its depression 26 receives the projections 28 upon the shaft 12. The engagement between the parts 26 and 28 takes place when the machine-shaft 14 has been brought to speed, and the clutch members 30 and 32 are engaged, and also when such clutch members are disengaged and the shaft 14 at rest in its normal position. In the first instance, the engagement of 26 and 28 furnishes a portion of the driving connections between the shafts 12 and 14. In the second, they keep the gear 24 in correct angular relation to the gear 22 when these are out of mesh. The sleeve 34, carrying the clutch member 30, is moved with the gear by toggle-connections. These connections include links 152 and 154 articulated to each other, the outer end of link 154 being pivoted to the lever 144, while the link 152 is joined to a lever 156 fulcrumed upon the frame and pivoted at its upper extremity to a yoke 158 engaging the clutch-sleeve 34. For the purpose of causing the engagement and disengagement of the clutch member 30 with respect to the member 32 upon the gear 24, the toggle furnished by the links 152 and 154 is broken and straightened, as will be described in connection with the carrying out of the second function of the gear 46.

For the performance of the second function of the Geneva gear 46, that is, the shifting of its companion gear 48, the helical gear 136 carries a crank-pin 160, joined by a link 162 to an arm 164 secured to one extremity of the spindle 100. At the opposite end of this spindle is an arm 166 (Fig. 4) having a yoke-portion 168 connected to a shaft 170, to which the gear 48 is fixed. These connections, for each rotation of the gear 136, move the Geneva gear 48 into and out of the plane of the roll 50, so that it may be actuated thereby or freed therefrom. Gear 48 drives through pins 172 (Fig. 5) in a one-to-two ratio a helical gear 174, the hub of which turns in the frame, while the shaft 170 is journaled in this hub. The gear 174 meshes with a like gear 176 rotatable upon the frame. The gear 176 carries a crank-pin 178 connected by a link 180 to an arm 182 secured upon a spindle 184 turning in the lower portion of the frame. At the opposite extremity of the spindle 184 is fixed an arm 186, to which is pivoted a link 188 articulated to the pivotal connection between the toggle-links 152 and 154. Through this connecting system, each 90 degrees of rotation of the Geneva gear 48 straightens the toggles to separate the clutch member 30 from the clutch member 32 by swinging the lever 156 to the left (Fig. 1), or breaks the toggle to produce engagement between the clutch members.

In the clutch-sleeve 34 is a depression 189 engaged by a detent or holding member 190 pivoted upon one end of a lever 192 fulcrumed on the spindle 184. The detent is moved by a link 194 pivotally connected to the lever 144, so that its upper engaging end is caused to travel with the sleeve 34 at substantially the same rate when this movement is effected by the lever 144, though the relation between the detent and clutch-sleeve may be changed, either by the actuation of the sleeve in a horizontal direction under the control of the Geneva gear 48, or by movement of the detent vertically. The end of the lever 192 opposite that upon which the detent 190 is mounted has joined to it a rod 196, in the upper end of which is a slot to receive a pin 198 projecting laterally from the lever 112 upon the sleeve 98, which carries the controlling lug 96 for the cam-lever 78. During the initial or inactive position of the mechanism, when the gear 24 and clutch-sleeve 34 are at the extreme left (Fig. 3), with the clutch-elements 30 and 32 separated, the lug 96 is at the right in its cam-lever-retaining position, and the pin 198 is maintained at its highest point by the action of the spring 102. A tension-spring 200, extending between the lever 192 and the frame, holds the uper end of the detent 190 in engagement with the depression 189 of the clutch-sleeve. This fixes the driven shaft 14 angularly in the correct starting position. If at this time it is desired to turn the machine over by hand for the purpose, for example, of effecting some adjustment, inclined walls 202 (Fig. 4) of the depression 189 will cam the detent 190 out of said depression, so the rotation of the machine-shaft 14 may take place. Detent 190 is now held against upward movement by the contact of its engaging extremity with the periphery of the clutch-sleeve. Consequently, the pin 198 is maintained from traveling down by the bottom of the slot in the now-elevated rod 196, which acts as a stop, so the lug 96 cannot be moved to free the cam-lever 78, and the operation of the mechanism cannot be started by depression of the treadle 104. If pressure is applied to this treadle at such time, the spring 110 merely yields, the upper section 108 of the treadle-rod remaining stationary. Before starting, therefore, the depression 189 must be brought back into engagement with the detent. After the action of the mechanism has been initiated by the release of the Geneva gear 46 by the cam-lever 78, contact of the lug 96 with the side of the portion 94 of the lever holds the lug to the left (Fig. 3) against the tension of the spring 102, and the pin 198 down upon the lower end of the slot in the link 196. This retains the detent 190 in the clutch-depression until the cam-lever has been permitted to swing to the right (Fig. 4) by the travel of the roll 64 or 66 away from its arcuate side. At this time, however, the Geneva gear 46 has started, and, through its connections, has moved the gear 24, and therefore the clutch-sleeve 34 and detent 190, to the right (Fig. 1). Now a pin 204 upon the detent rides over a surface 206 upon some such fixed element as a portion of the frame, preventing the downward disengagement of the detent from the sleeve-depression. Consequently, the definiteness of relation between the clutch member 30 and the shaft 14 persists until the clutch-sleeve 34 is itself shifted by the operation of the Geneva gear 48, at which time said sleeve travels away from the detent 190 but immediately engages the companion clutch member 32. These features lead to a constancy of relation at all times between the engaging portions of the clutch members, and, the machine shaft 14 having been placed in starting position and the treadle depressed, said shaft cannot rotate until it has been rigidly connected to the gear 24 and the driving shaft 12.

In describing the general operation of the improved system, it should be pointed out that the positions of the elements as illustrated in the drawings, save in Fig. 3, represent them at an intermediate stage, during which the controlling action involved in either starting or stopping the driven shaft 14 is going on. When the elements are normal, or in preparation for starting or stopping the machine-shaft, as appears in part in Fig. 3, one of the rolls 64 or 66 connected to the Geneva gear 46 will be resting upon the high point $b$ of the cam 76, which is held in position for such co-operation by the contact of the extension 94 of the lever 78 with the lug 96. Both the Geneva gear 46 and the Geneva gear 48 which it controls will therefore be out of the path of the constantly driven actuating roll 50. Consequently, the gear 24 of the connecting apparatus will be in its extreme left position, out of mesh with the gear 22, and the clutch-sleeve 34 will be correspondingly located, with the clutch-portions 30 and 32 disengaged because of the straightened relation of the toggle-links 152 and 154. The detent 190 lies now above the space in the frame at the left of the surface 206, and occupies the depression 189 in the clutch-sleeve, holding it and the machine-shaft 14 in a predetermined angular position. The depression 26 in the gear 24 is engaged by the projections 28 of the driving shaft 12, the gear 24 at this time rotating idly with the counter-shaft 16.

To start the machine-shaft 14 in operation, the treadle 104 is depressed, drawing the lug 96 away from the end of the cam-lever extension 94 through the independently movable detent 114. If the Geneva gear 46, its actuating projection 50 and retaining hub 52 are in the proper relation, cam 128 upon the shaft-section 126, rotating with the roll 50, will be in an ineffective position as regards restraint of movement of the cam-lever 78, so the latter will swing in a clockwise direction (Fig. 4), away from the roll upon the bar 62, which, as the parts are illustrated, may be considered as that designated by the numeral 66. Thus released, the Geneva gear 46 is pressed into the field of action of the roll 50 by the lever 120, which, at the same time, through the lug 132, trips the detent 114 to release the treadle from its connection with the sleeve 98, leaving the mechanism independent of movement of the treadle by the operator. The roll 50 now rotates the Geneva gear 46 through 90 degrees by its own initial controlling travel through a like arc. Rotation of the gear 136 with its crank-pins 140 and 160 is thereby effected, this turning through 180 degrees for each 90 degrees of angular movement of the gear 72 and the Geneva gear 46. During the first 90 degrees of rotation of this Geneva gear 46 upon its engagement by the roll 50, the travel of the crank-pin 140 in a clockwise direction (Fig. 1) through the intermediate rod and lever-connections, shifts the gear 24 into mesh with the gear 22. This takes place during the co-operation of those portions of the gears between the points A, B and E, F, respectively, which are traveling at equal speeds, gear 22 being constantly driven by the shaft 16, while gear 24 has been under the driving influence of the shaft 12, from which it is now disengaged by the separation of the recess 26 from the projections 28. With the gear 24 moves the clutch-sleeve 34 and the detent 190, the last-named element still occupying the depression in the sleeve to hold this against rotary displacement. In this position of the elements, the detent cannot be disengaged from the clutch-sleeve, because of the contact of its pin 204 with the frame-surface 206.

During the next 90 degrees of movement of the roll 50 in the controlling cycle, in which the Geneva gear 46 rests idly, held by the hub 52, the gear 24 is being retarded by the action of the portion from B to C of decreasing radius of the gear 22 upon the increasing portion F to G of gear 24. This gradually reduces the speed of the last-mentioned gear to zero. At the end of this period, the roll 50 comes into co-operation with the Geneva gear 48, which has been brought into operative relation to the roll by the action of the crank-pin 160 through the intermediate connections, this occurring with the shifting of the gear 24 and the clutch-sleeve 34 by the crank-pin 140 during the initial period of action of the roll 50. The transfer of the gear 48 is completed as the roll 50 starts from its co-operation with the gear 46 toward said gear 48. The beginning of the third 90 degrees of revolution of the roll 50 finds co-operation between the projection of the gear 24 between G and H and the depression of the gear 22 between C and D, so that the first-mentioned gear is at rest. As a result of this, the clutch-portion 30, which, with the machine-shaft 14, is also stationary, may be brought into engagement with the portion 32, wholly without shock, this being accomplished by the toggle mechanism actuated from Geneva gear 48 through the connections including the crank-pin 178 of spiral gear 176. The roll 50, in passing from the gear 48 back to the gear 46, gives a period of inactivity in the controlling apparatus, during which the gear 24, now clutched fast at 30, 32 to the machine-shaft 14, is accelerated from zero in a definite length of time to the speed of the driving shaft 12 by the portion D to A of increasing radius of the gear 22, and the portion H to E of decreasing radius of gear 24. Action of the roll 50 for a second time upon the Geneva gear 46 moves this through another 90 degrees, carrying, through the connections to the crank-pin 140 of gear 136, the gear 24 out of mesh with the gear 22, and depression 26 into engagement with the projections 28 of the driving shaft 12. As the speed of rotation of the elements thus joined is the same, there is no resulting shock. At the same time, the Geneva gear 48 is moved out of the path of the roll 50, so the clutch 30, 32 remains in engagement as the roll continues on to normal. Thus, the machine-shaft 14 is directly connected to the driving shaft 12, and here also, since they are rotating at the same speed, this is effected smoothly and without shock. The detent 190 has, of course, also moved in this change of position with the clutch-sleeve 34, which, through the closing of the clutch, has traveled to the right (Fig. 1) out of engagement with said detent. At the completion of the second 90 degrees of movement of the Geneva gear 46, the opposite roll 64 from that previously released from the lever 78 reaches the cam-surface 76, and, riding up this from $a$ to $b$, draws the gear 46 away from the roll 50. The gear 46, however, lags behind the carrier-bar 62 in this lateral movement, because of the frictional resistance created by the driving contact of the roll 50, and because of interference between the gear and the end of the surface of the hub 52 adjacent to the cut-away portion 54. By the resistance, the spring 70, between the sleeve 60 and shaft 58, is compressed. When the gear has completed its final 90 degrees of travel, the latter part of which occurs when the high point $b$ of the cam 76 is reached, the gear will be released from the roll 50, and is forced by the expansion of the spring 70 against the face of the helical gear 72 completely out of the path of the roll 50. The Geneva gears and the elements through which they exercise control of the gear 24 and clutch 30, 32 are thus brought to rest in definite positions, ready for the next operation.

To arrest the rotation of the machine-shaft 14, the action is similar to that just described, the roll 64, rather than the roll 66, being now freed from the cam-lever 78 to release the Geneva gear 46, and the toggle-links 152 and 154 being straightened to separate the clutch-portions 30 and 32, instead of being broken, as in starting. The opening of the clutch occurs at a predetermined point in the rotation of the shaft 14, this being retained by the detent 190 until the succeeding starting operation. An apparatus driven by the shaft 14 may therefore be accurately stopped in the position from which it is started. It may be noted that during a cycle of operation of the controlling mechanism, the Geneva gear 46 moves through 180 degrees, and for each 90 degrees of this travel shifts the companion gear 48 either into or out of the field of action of the roll 50. As a result of this, gear 48 is moved twice laterally during the cycle, both into and out of engagement with the roll. It is therefore in position for engagement with this roll but once in said roll's revolution, so the gear 48 is moved only once for two movements made by the gear 46. Consequently, although the gear 24 and the elements 26 and 28 assume the same positions at the end of each starting or stopping cycle, the clutch-portions 30 and 32 are alternately closed and opened at the ends of succeeding cycles.

In detail, the stopping of the driven shaft 14 may be traced as follows: The treadle 104 is depressed, drawing the lug 96 away from the end of the cam-lever extension 94 through the independently movable detent 114. If the Geneva gear 46, its actuating projection 50 and retaining hub 52 are in the proper relation, cam 128 upon the shaft-section 126, rotating with the roll 50, will be in an ineffective position as regards restraint of movement of the cam-lever 78, so the latter will swing in a clockwise direction (Fig. 4), away from the roll upon the bar 62, which, as the parts are illustrated, may be considered as that designated by the numeral 64. Thus released, the Geneva gear 46 is pressed into the field of action of the roll 50 by the lever 120, which, at the same time, through the lug 132, trips the detent 114 to release the treadle from its connection with the sleeve 98, leaving the mechanism independent of movement of the treadle by the operator. The roll 50 now rotates the Geneva gear 46 through 90 degrees by its own initial controlling travel through a like arc. Rotation of the gear 136 with its crank-pins 140 and 160 is thereby effected, this turning through 180 degrees for each 90 degrees of angular movement of the gear 72 and the Geneva gear 46. During the first 90 degrees of rotation of this Geneva gear 46 upon its engagement by the roll 50, the travel of the crank-pin 140 in a clockwise direction (Fig. 1) through the intermediate rod and lever-connections, shifts the gear 24 into mesh with the gear 22. This takes place during the co-operation of those portions of the gears between the points A, B and E, F, respectively, which are traveling at equal speeds, gear 22 being constantly driven by the shaft 16, while gear 24 has been under the driving influence of the shaft 12, from which it is now disengaged by the separation of the recess 26 from the projections 28. With the gear 24 moves the clutch-sleeve 34 and the detent 190, the last-named element being outside the depression in the sleeve, leaving this free for rotation.

During the next 90 degrees of movement of the roll 50 in the controlling cycle, in which the Geneva gear 46 rests idly, held by the hub 52, the gear 24 is being retarded by the action of the portion from B to C of decreasing radius of the gear 22 upon the increasing portion F to G of gear 24. This gradually reduces the speed of the last-mentioned gear to zero. Since the driven shaft 14 is clutched to the gear 24 by the engaged portions 30, 32, this is also brought to a stop. At the end of this period, the roll 50 comes into co-operation with the Geneva gear 48, which has been brought into operative relation to the roll by the action of the crank-pin 160 through the intermediate connections, this occurring with the shifting of the gear 24 and the clutch-sleeve 34 by the crank-pin 140 during the initial period of action of the roll 50. The transfer of the gear 48 is completed as the roll 50 starts from its co-operation with the gear 46 toward said gear 48. The beginning of the third 90 degrees of revolution of the roll 50 finds co-operation between the projection of the gear 24 between G and H and the depression of the gear 22 between C and D, so that the first-mentioned gear is at rest. As a result of this, the clutch-portion 30, which, with the machine-shaft 14, is also stationary, may be carried from engagement with the portion 32, wholly without shock, this being accomplished by straightening the links of the toggle mechanism actuated from Geneva gear 48 through the connections including the crank-pin 178 of spiral gear 176. In the movement of the sleeve 34 carrying the portion 30, its depression engages the detent 190 to fix the position of the shaft 14. The roll 50, in passing from the gear 48 back to the gear 46, gives a period of inactivity in the controlling apparatus, during which the gear 24, now unclutched at 30, 32 from the machine-shaft 14, is accelerated from zero in a definite length of time to the speed of the driving shaft 12 by the portion D to A of increasing radius of the gear 22, and the portion H to E of decreasing radius of gear 24. Action of the roll 50 for a second time upon the Geneva gear 46 moves this through another 90 degrees, carrying, through the connections to the crank-pin 140 of gear 136, the gear 24 out of mesh with the gear 22, and the depression 26 into engagement with the projections 28 of the driving shaft 12. As the speed of rotation of the elements thus joined is the same, there is no resulting shock. At the same time, the Geneva gear 48 is moved out of the path of the roll 50, so the clutch 30, 32 remains out of engagement as the roll continues on to normal. Thus, the machine-shaft 14 is disconnected from the driving shaft 12, and here also, since they are rotating at the same speed, this is effected smoothly and without shock. The detent 190 has, of course, also moved in this change of position with the clutch-sleeve 34, which, through the opening of the clutch, has traveled to the left (Fig. 3) in engagement with said detent. At the completion of the second 90 degrees of movement of the Geneva gear 46, the opposite roll 66 from that previously released from the lever 78 reaches the cam-surface 76, and, riding up this from $a$ to $b$, draws the gear 46 away from the roll 50. The gear 46, however, lags behind the carrier-bar 62 in this lateral movement, because of the frictional resistance created by the driving contact of the roll 50, and because of interference between the gear and the end of the surface of the hub 52 adjacent to the cut-away portion 54. By the resistance, the spring 70, between the sleeve 60 and shaft 58, is compressed. When the gear has completed its final 90 degrees of travel, the latter part of which occurs when the high point $b$ of the cam 76 is reached, the gear will be released from the roll 50, and forced by the expansion of the spring 70 against the face of the helical gear 72 completely out of the path of the roll 50. The Geneva gears and the elements through which they exercise control of the gear 24 and clutch 30, 32 are thus brought to rest in definite positions, ready for the next operation.

If the Geneva gear 46 were allowed to move into and out of the path of roll 50 more than once during a single cycle of starting or stopping, the clutch members 30, 32 would be opened or closed while running, which would defeat the purpose of the system. To preclude this possibility, a stationary retaining member 208 (Fig. 1) is fixed to the frame above the bar 62 in such a position that the roll 64 or 66 passes along its inner surface 210. This prevents the rolls from allowing lateral movement of the bar, and therefore maintains the Geneva gear in co-operation with the roll 50, from the beginning of the first rotative movement of the bar until it is about to be forcibly moved laterally by the cam 76. The surface 210 of the retaining member, over which the rolls travel, may be of cam shape, or inclined, to assist the spring 124 in imparting lateral movement to the Geneva gear 46 into its active position.

Having described my invention, what I claim as new and desire to secure by Letters Patent of the United States is:—

1. A controlling system comprising a driving member, a driven member, and apparatus arranged for engagement and disengagement to positively connect said members and to disconnect them and to stop the driven member in a predetermined position.

2. A controlling system comprising a driving member, a driven member, automatic apparatus arranged to be engaged to positively connect said members and to be moved out of engagement to disconnect them and to stop the driven member in a predetermined position, and operator-governed means for initiating the controlling action of the apparatus.

3. A controlling system comprising a driving member, a driven member, automatic apparatus arranged to positively connect said members and to disconnect them and to stop the driven member in a predetermined position, and means independent of the driving connection for temporarily holding the driven member in such predetermined position.

4. A controlling system comprising a driving member, a driven member, automatic apparatus arranged to positively connect said members and to disconnect them and to stop the driven member in a predetermined position, and means for temporarily holding the driven member in such predetermined position, said holding means being arranged for release upon the application of force to the driven member.

5. A controlling system comprising a driving member, a driven member, automatic apparatus arranged to positively connect said members and to disconnect them and to stop the driven member in a predetermined position, means for temporarily holding the driven member in such predetermined position, said holding means being arranged for release while the controlling system is inactive upon the application of force to the driving member, and means for positively preventing such release during the operation of the controlling system.

6. A controlling system comprising a driving member, a driven member, automatic apparatus arranged to positively connect said members and to disconnect them and to stop the driven member in a predetermined position, said apparatus including means for temporarily holding the driven member in such predetermined position, and operator-governed means for initiating the controlling action of the apparatus.

7. A controlling system comprising a driving member, a driven member arranged for connection to and disconnection from the driving member, movable means arranged to vary the connection of the members, and automatic means for changing the rate of movement of said means in preparation for the variation of connection.

8. A controlling system comprising a driving member, a driven member, movable means arranged to connect the driving and driven members by positive engagement, and automatic means for changing the rate of movement of the connecting means in preparation for the engagement.

9. A controlling system comprising a driving member, a driven member arranged for connection to and disconnection from the driving member, movable means arranged to vary the connection of the members, and means for successively decreasing and increasing the rate of movement of an element of said connection-varying means in preparation for the variation of connection.

10. A controlling system comprising a driving member, a driven member arranged for connection to and disconnection from the driving member, movable means arranged to vary the connection of the members, and means for successively decreasing and increasing the rate of movement of an element of said connection-varying means in preparation for the variation of connection and for producing an intermediate period of rest of said element.

11. A controlling system comprising a driving member, a driven member arranged for connection to and disconnection from the driving member, movable means arranged to vary the connection of the members, means for successively decreasing and increasing the rate of movement of an element of said connection-varying means in preparation for the variation of connection and for producing an intermediate period of rest of said element, and means for effecting a portion of the connection or disconnection during such period of rest.

12. A controlling system comprising a driving member, a driven member arranged for connection to and disconnection from the driving member, movable means arranged to vary the connection of the members, means for successively decreasing and increasing the rate of movement of an element of said connection-varying means in preparation for the variation of connection and for producing an intermediate period of rest of said element, means for effecting a portion of the connection or disconnection during such period of rest, and means for thereafter completing the connection or disconnection.

13. A controlling system comprising a driving member, a driven member, an intermediate element, and automatic means for successively connecting said element to the respective members.

14. A controlling system comprising a driving member, a driven member, an intermediate element, means for successively connecting said element to the respective members, and means arranged to connect the intermediate element directly to the driving member during the period of disconnection of the driven member from said driving member.

15. A controlling system comprising a driving member, a driven member, an intermediate element, means for connecting the intermediate element to the driving member to move at the same speed thereas, means for connecting the intermediate element to the driving member to move at a different speed, and means for connecting the intermediate element to and disconnecting it from the driven member.

16. A controlling system comprising a driving member, a driven member, an intermediate element, means for successively connecting the intermediate element to the driving member to move at the same speed thereas and at varying speeds, and means for connecting the intermediate element to and disconnecting it from the driven member during the periods in which the speed varies.

17. A controlling system comprising a driving member, a driven member, an intermediate element, means for directly connecting the intermediate element to the driving member, gearing for connecting the intermediate element to the driving member, and a clutch device co-operating with the intermediate element and driven member.

18. A controlling system comprising a driving member, a driven member, an intermediate element, means for directly connecting the intermediate element to the driving member, gearing for connecting the intermediate element to the driving member, said intermediate element being arranged to move simultaneously out of engagement with one of such connecting means and into engagement with the other, and a clutch device co-operating with the intermediate element and driven member.

19. A controlling system comprising a driving member, a driven member, an intermediate element, means for directly connecting the intermediate element to the driving member, gearing for connecting the intermediate element to the driving member, a clutch device co-operating with the intermediate element and driven member, and automatic means for moving the intermediate element to cause either its connection to the driving member directly or through the gearing and for operating the clutch device.

20. A controlling system comprising a driving member, a driven member, an intermediate element, means for directly connecting the intermediate element to the driving member, gearing for connecting the intermediate element to the driving member, a clutch device co-operating with the intermediate element and driven member, and automatic means for moving the intermediate element to cause either its connection to the driving member directly or through the gearing and for operating the clutch device while the intermediate element is geared to the driving member.

21. A speed-changing system comprising a driving shaft, a driven shaft, a jaw-clutch interposed between the driving and driven shafts, and automatic means arranged to disconnect the clutch to stop the driven shaft in a predetermined position.

22. A speed-changing system comprising a driving shaft, a driven shaft, co-operating members of a positive clutch carried respectively by the driving and driven shafts, means for disconnecting the clutch members, and a member arranged to hold the driving clutch member upon its disconnection in a predetermined angular position.

23. A speed-changing system comprising a driving shaft, a driven shaft, co-operating clutch members carried respectively by the driving and driven shafts, means for disconnecting the clutch members, and a member arranged to hold the driving clutch member upon its disconnection in a predetermined angular position, the holding member and driven clutch member being arranged to facilitate disengagement upon rotation of said clutch member.

24. A speed-changing system comprising a driving shaft, a driven shaft, co-operating clutch members carried respectively by the driving and driven shafts, means for moving the driven clutch member to disconnect it from the driving member, and a member for holding the driven clutch member upon disconnection in a predetermined angular position and being movable with said driven clutch member.

25. A speed-changing system comprising a driving shaft, a driven shaft, co-operating clutch members carried respectively by the driving and driven shafts, means for moving the driven clutch member to disconnect it from the driving member, a member for holding the driven clutch member upon disconnection and being movable with said driven clutch member, and means for producing relative movement between the holding member and said driven clutch member.

26. A speed-changing system comprising a driving shaft, a driven shaft, co-operating clutch members carried respectively by the driving and driven shafts, means for moving the driven clutch member to disconnect it from the driving member, and a member for holding the driven clutch member upon disconnection and being movable in the same direction as the driven clutch member, the holding member being also arranged to move laterally of such direction of movement.

27. A speed-changing system comprising a driving shaft, a driven shaft, co-operating clutch members carried respectively by the driving and driven shafts, means for moving the driven clutch member to disconnect it from the driving member, a member for holding the driven clutch member upon disconnection and being movable in the same direction as the driven clutch member, the holding member being also arranged to move laterally of such direction of movement, and means for preventing the lateral movement of the holding member in certain positions.

28. A speed-changing system comprising a driving shaft, a driven shaft, co-operating clutch members carried respectively by the driving and driven shafts, means for moving the driven clutch member to disconnect it from the driving member, and a member for holding the driven clutch member upon disconnection and being movable in the same direction as the driven clutch member, the holding member being also arranged to move laterally of such direction of movement, there being a surface preventing the lateral movement in certain positions and over which the holding member travels.

29. A speed-changing system comprising a driving shaft, a driven shaft, and connections between the shafts including a gear rotatable about the driving shaft, means for rotating said gear from the driving shaft at varying speeds, and means for connecting the gear directly to the driving shaft.

30. A speed-changing system comprising a driving shaft, a driven shaft, a counter-shaft, means for rotating the counter-shaft from the driving shaft, variable-speed gearing between the counter-shaft and driven shaft, and means for connecting one of the gears of said gearing directly to the driving shaft.

31. A speed-changing system comprising a driving shaft, a driven shaft, a counter-shaft, means for rotating the counter-shaft from the driving shaft, variable-speed gearing between the counter-shaft and driven shaft, and means for disconnecting one of the gears of said gearing from its companion gear and connecting it directly to the driving shaft for idle rotation.

32. A speed-changing system comprising a driving shaft, a driven shaft, a counter-shaft, means for rotating the counter-shaft from the driving shaft, variable-speed gearing between the counter-shaft and driven shaft, one of the gears of said gearing being rotatable about the driving shaft and movable laterally out of engagement with its companion gear, and a clutch acting in the disengagement to connect said laterally movable gear to the driving shaft.

33. A speed-changing system comprising a driving shaft, a driven shaft, means for varying the connection between the shafts and for stopping the driven shaft in a predetermined position, automatic controlling apparatus for the connection-varying means, operator-governed means for initiating the action of the controlling apparatus, and means acting upon the operator-governed means and arranged to render it ineffective when the driving shaft is out of such predetermined position.

34. A speed-changing system comprising a driving shaft, a driven shaft, means for varying the connection between the shafts, a holding member for an element of the connection-varying means, automatic controlling apparatus for the connection-varying means, operator-governed means for initiating the action of the controlling apparatus, and connections between the operator-governed means and holding member arranged to control movement of the former.

35. A speed-changing system comprising a driving shaft, a driven shaft, means for varying the connection between the shafts and including a clutch member, controlling apparatus for the connection-varying means and including a detent engaging the clutch member, a treadle arranged to start the controlling apparatus, and connections between the detent and treadle.

36. A speed-changing system comprising a driving shaft, a driven shaft, means for varying the connection between the shafts and including a clutch member, controlling apparatus for the connection-varying means and including a detent engaging the clutch member, a treadle, yieldable connections to the treadle arranged to govern the controlling apparatus, and a stop member joined to the detent and co-operating with the treadle-connections.

37. In a speed-changing system, a driving shaft, a driven shaft, and connecting apparatus between the shafts and comprising gearing and clutch mechanism, said gearing being arranged to vary the speed of an element of the clutch mechanism for each shift thereof.

38. In a speed-changing system, a driving shaft, a driven shaft, and connecting apparatus between the shafts and comprising gearing and clutch mechanism, said gearing being arranged to oppositely vary the speed of an element of the clutch mechanism in preparation for the connection and disconnection of the shafts thereby.

39. In a speed-changing system, a driving shaft, a driven shaft, connecting apparatus between the shafts and comprising gearing and clutch mechanism, said gearing being arranged to increase the speed of the driven shaft to that of the driving shaft, and means for thereupon completing the connection of the driven shaft to the driving shaft by the clutch mechanism.

40. In a speed-changing system, a driving shaft, a driven shaft, connecting apparatus between the shafts and comprising gearing and clutch mechanism, said gearing including an element normally rotated by the driving shaft, means for decreasing the speed of said gearing element to zero, and means for actuating the clutch mechanism during this zero period to connect the gearing element and driven shaft, the speed of the gearing element and that of the driven member thereupon being increased to that of the driving shaft.

41. In a speed-changing system, a driving shaft, a driven shaft, connecting apparatus between the shafts and comprising gearing and clutch mechanism, said gearing including an element normally rotated by the driving shaft, means for decreasing the speed of said gearing element to zero, means for actuating the clutch mechanism during this zero period to connect the gearing element and driven shaft, the speed of the gearing element and that of the driven member thereupon being increased to that of the driving shaft, and means for finally connecting the gearing element to the driving shaft.

42. A speed-changing system comprising a driving shaft, a driven shaft, gearing interposed between the shafts and organized to cause the speed of one of its elements both to decrease and increase during a single rotation, and clutch mechanism arranged to connect and disconnect the driving and driven shafts of predetermined points in the cycle of speed changes.

43. A speed-changing system comprising a driving shaft, a driven shaft, gearing interposed between the shafts and organized to cause the speed of one of its elements both to decrease and increase during a single rotation, and clutch mechanism including a plurality of jaw-clutch devices arranged to connect and disconnect the gearing element and the driving and driven shafts at predetermined points in the cycle of speed changes.

44. A speed-changing system comprising a driving shaft, a driven shaft, gearing interposed between the shafts and organized to cause the speed of one of its elements both to decrease and increase during a single rotation, and clutch mechanism including a jaw-clutch device arranged to connect to the driven shaft the gearing element after its decrease in speed and a jaw-clutch device arranged to connect to the driving shaft said gearing element after its increase in speed.

45. A speed-changing system comprising a driving shaft, a driven shaft, a counter-shaft, constant-speed gearing connecting the driving shaft and counter-shaft, variable-speed gearing arranged to connect the counter-shaft and driven shaft, and clutch mechanism arranged to connect the driving and driven shafts.

46. A speed-changing system comprising a driving shaft, a driven shaft, a counter-shaft, constant-speed gearing connecting the driving shaft and counter-shaft, variable-speed gearing arranged to connect the counter-shaft and driven shaft, and clutch mechanism arranged to connect the driving and driven shafts through an element of the variable-speed gearing.

47. A speed-changing system comprising a driving shaft, a driven shaft, a counter-shaft, constant-speed gearing connecting the driving shaft and counter-shaft, variable-speed gearing including an element fast upon the counter-shaft and an element movable upon the driving shaft into and out of mesh with the companion element, a clutch device operable in the movement of the gearing element and connecting it to and disconnecting it from the driving shaft, and a clutch device arranged to connect said gearing element to the driven shaft.

48. A speed-changing system comprising a driving shaft, a driven shaft, and connections between the shafts including gears having intermeshing toothed portions changing oppositely in diameter and also having a portion with a pitch radius of zero, and clutch mechanism arranged to connect the shafts.

49. A speed-changing system comprising a driving shaft, a driven shaft, connections between the shafts including a pair of gears having intermeshing toothed portions respectively increasing and decreasing in diameter, other toothed portions respectively decreasing and increasing in diameter, intermediate portions, one toothed and of equal diameter in the two gears and another having a pitch radius of zero, and clutch mechanism arranged to connect the driving and driven shafts.

50. A controlling system comprising a driving member, a driven member, a plurality of movable means arranged to vary the connection between said members, and a plurality of automatic controlling mechanisms arranged to separately actuate the connection-varying means.

51. A controlling system comprising a driving member, a driven member, a plurality of movable means arranged to cause the connection and disconnection of said members, a plurality of automatic controlling mechanisms arranged to separately actuate said means, and operator-governed means for initiating the controlling action of one of the mechanisms, said mechanism governing the action of another mechanism.

52. A controlling system comprising a driving member, a driven member, means for varying the connection of the driving and driven members, a plurality of controlling mechanisms for said connection-varying means, and a traveling member arranged to successively actuate the controlling mechanisms.

53. A controlling system comprising a driving member, a driven member, means for varying the connection of the driving and driven members, and a plurality of controlling mechanisms for said connection-varying means, one of said controlling mechanisms being governed by another.

54. A controlling system comprising a driving member, a driven member, movable means for varying the connection of said members, a traveling member movable under the influence of the driving member, and controlling mechanism for the connection-varying means, said mechanism including an element movable into and out of the path of the traveling member.

55. A controlling system comprising a driving member, a driven member, movable means for varying the connection of said members, a traveling member movable under the influence of the driving member, controlling mechanism for the connection-varying means, and operator-governed means for moving an element of the controlling mechanism into the path of the traveling member, the mechanism in its action moving said element out of the path of the traveling member.

56. A controlling system comprising a driving member, a driven member, means for varying the connection of the driving and driven members, a plurality of controlling mechanisms for said connection-varying means, and a traveling member arranged to successively actuate the controlling mechanisms, one of said controlling mechanisms being constructed and arranged to move an element of an associated controlling mechanism into and out of the field of action of the traveling member.

57. A controlling system comprising a driving member, a driven member, means for varying the connection of the driving and driven members, and controlling apparatus for the connection-varying means and including a rotatable member arranged to transmit power by its rotation to said connection varying means, and an element actuated by the driving member to intermittently rotate the controlling member.

58. In a speed-changing system, a driving shaft, a driven shaft, connecting apparatus between the shafts and including variable-speed gearing one of the gears of which is movable into and out of mesh with another, and controlling apparatus for moving the gear, said controlling apparatus including an intermittently rotatable gear and a member actuated by the driving shaft to rotate said gear.

59. In a speed-changing system, a driving shaft, a driven shaft, connecting apparatus between the shafts and including variable-speed gearing one of the gears of which is movable into and out of mesh with another, and controlling apparatus for moving the gear, said controlling apparatus including a Geneva gear and a projection revoluble by the driving shaft and contacting with said Geneva gear to rotate it intermittently.

60. In a speed-changing system, a driving shaft, a driven shaft, connecting apparatus between the shafts and including variable-speed gearing one of the gears of which is movable into and out of mesh with another, and controlling apparatus for moving the gear, said controlling apparatus comprising intermittent-rotation gearing and means acting during one of the periods of rotation of the intermittent gearing for moving the variable-speed gearing into mesh and thereafter moving said variable-speed gearing out of mesh.

61. In a speed-changing system, a driving shaft, a driven shaft, connecting apparatus between the shafts and including variable-speed gearing one of the gears of which is movable into and out of mesh with another, and controlling apparatus for moving the gear, said controlling apparatus comprising intermittent-rotation gearing, means acting during one of the periods of rotation of the intermittent gearing for moving the variable-speed gearing into mesh and thereafter moving said variable-speed gearing out of mesh, and means acting during such movement of the variable-speed gearing for connecting said gear directly to and disconnecting it from the driving shaft.

62. In a speed-changing system, a driving shaft, a driven shaft, connecting apparatus between the shafts and including variable-speed gearing one of the gears of which is movable into and out of mesh with another, and controlling apparatus for moving the gear, said controlling apparatus comprising intermittent-rotation gearing and means acting during one of the periods of rotation of the intermittent gearing for moving the variable-speed gearing into mesh and thereafter moving said variable-speed gearing out of mesh, the variable-speed gear and driving shaft being provided with a co-operating projection and depression for engagement and disengagement during such movement.

63. In a speed-changing system, a driving shaft, a driven shaft, connecting apparatus between the shafts and including variable-speed gearing one of the gears of which is movable into and out of mesh with another, and controlling apparatus for moving the gear, said controlling apparatus including a Geneva gear operable under the influence of the driving shaft and crank mechanism actuated by the Geneva gear and arranged to shift the variable-speed gear.

64. A controlling system comprising a driving member, a driven member, a plurality of movable means arranged to connect and disconnect said members, and a plurality of controlling mechanisms, one of said mechanisms being arranged to operate one of the connecting and disconnecting means and to initiate the action of another controlling mechanism and thereafter to cause the cessation of its own action.

65. A controlling system comprising a driving member, a driven member, a plurality of movable means arranged to connect and disconnect said members, and a plurality of controlling mechanisms arranged to separately actuate the connecting and disconnecting means, one of the controlling mechanisms acting intermittently and arranged during one period of action to operate one of the connecting and disconnecting means and during another period of action to initiate the operation of the associated controlling mechanism, said associated controlling mechanism being arranged to operate another connecting and disconnecting means.

66. In a speed-changing system, a driving shaft, a driven shaft, connecting apparatus between the shafts and comprising variable-speed gearing one of the gears of which is movable into and out of mesh with another and two clutch devices, and controlling apparatus for the connecting apparatus and comprising two intermittently movable gears, connections to one of the intermittent gears for shifting the variable-speed gear and for actuating one of the clutch devices and connections to the other intermittent gear for actuating the associated clutch device.

67. In a speed-changing system, a driving shaft, a driven shaft, connecting apparatus between the shafts and comprising variable-speed gearing one of the gears of which is movable into and out of mesh with another and two clutch devices, and a controlling apparatus for the connecting apparatus and comprising two Geneva gears movable to control its operation, connections between one of the Geneva gears and the variable-speed gear and between said Geneva gear and one of the clutch devices and the associated Geneva gear, and connections between the last-mentioned Geneva gear and another clutch device.

68. A controlling system comprising a driving member, a driven member, connecting and disconnecting means therefor, a rotatable and bodily movable controlling member for said means, a traveling actuating member for the controlling member, means tending to force the controlling member bodily into the path of the actuating member, a member for normally retaining the controlling member out of the path of the actuating member, and means for releasing the controlling member from the retaining member.

69. A controlling system comprising a driving member, a driven member, connecting and disconnecting means therefor, a rotatable and bodily movable controlling member for said means, a traveling actuating member for the controlling member, means tending to force the controlling member bodily into the path of the actuating member, a member for normally retaining the controlling member out of the path of the actuating member, and means for releasing the controlling member from the retaining member, there being means acting in the rotation of the controlling member for disengaging it from the actuating member.

70. A controlling system comprising a driving member, a driven member, connecting and disconnecting means therefor, a rotatable and bodily movable controlling member for said means, a traveling actuating member for the controlling member, means tending to force the controlling member bodily into the path of the actuating member, a member for normally retaining the controlling member out of the path of the actuating member, and means for releasing the controlling member from the retaining member, said retaining member being provided with means for restoring the controlling member to its normal position.

71. A controlling system comprising a driving member, a driven member, connecting and disconnecting means therefor, a rotatable gear movable longitudinally of its axis and arranged in its rotation to control said means, a revoluble member for rotating the gear, means tending to force the gear along its axis into engagement with the revoluble member, and a movable retaining member normally preventing such movement.

72. A controlling system comprising a driving member, a driven member, connecting and disconnecting means therefor, an intermittently rotatable gear movable longitudinally of its axis and arranged in its rotation to control said means, a revoluble member for rotating the gear, means tending to force the gear along its axis into engagement with the revoluble member, and a movable retaining member normally preventing such movement, said retaining member being provided with a cam-surface arranged to disengage the gear from the revoluble member.

73. A speed-changing system comprising a driving shaft, a driven shaft, connecting and disconnecting means therefor, a projection revoluble by the driving shaft, a Geneva gear arranged for axial movement and for rotation by the projection, connections between said gear and the connecting and disconnecting means, a spring arranged to move the gear into the path of the projection, and means acting in the rotation of the gear for moving it out of said path.

74. A speed-changing system comprising a driving shaft, a driven shaft, connecting and disconnecting means therefor, a projection revoluble by the driving shaft, a Geneva gear arranged for axial movement and for rotation by the projection, connections between said gear and the connecting and disconnecting means, a spring arranged to move the gear into the path of the projection, and a member normally retaining the gear against the force of the spring and having a cam-surface arranged to move the gear axially.

75. A speed-changing system comprising a driving shaft, a driven shaft, connecting and disconnecting means therefor, a projection revoluble by the driving shaft, a Geneva gear arranged for axial movement and for rotation by the projection, connections between said gear and the connecting and disconnecting means, a bar movable with the gear, and a lever fulcrumed adjacent to the bar for movement into and out of engagement therewith.

76. A speed-changing system comprising a driving shaft, a driven shaft, connecting and disconnecting means therefor, a projection revoluble by the driving shaft, a Geneva gear arranged for axial movement and for rotation by the projection, connections between said gear and the connecting and disconnecting means, a bar movable with the gear and having rolls rotatable upon its extremities, and a lever fulcrumed adjacent to the bar for movement into and out of engagement therewith, said lever having a surface over which the rolls are successively forced in the rotation of the Geneva gear.

77. A controlling system comprising a driving member, a driven member, means for varying the connection between the members, a movable controlling member for the connection-varying means, means tending to force the controlling member into operating position, a movable member for normally retaining the controlling member out of operating position, a latch for said retaining member, and means arranged to move the latch and free the retaining member.

78. A controlling system comprising a driving member, a driven member, connecting and disconnecting means therefor, a rotatable and bodily movable controlling member for said means, a traveling actuating member for the controlling member, means tending to force the controlling member bodily into the path of the actuating member, a member for normally retaining the controlling member out of the path of the actuating member, means tending to move the retaining member to release the controlling member, and a latch arranged to normally hold the retaining member in its retaining position.

79. A controlling system comprising a driving member, a driven member, connecting and disconnecting means therefor, a rotatable and bodily movable controlling member for said means, a traveling actuating member for the controlling member, means tending to force the controlling member bodily into the path of the actuating member, a member for normally retaining the controlling member out of the path of the actuating member, means tending to move the retaining member to release the controlling member, a latch arranged to normally hold the retaining member in its retaining position, and operator-controlled means for releasing the retaining member from the latch.

80. A controlling system comprising a driving member, a driven member, connecting and disconnecting means therefor, a rotatable and bodily movable controlling member for said means, a traveling actuating member for the controlling member, means tending to force the controlling member bodily into the path of the actuating member, a member for normally retaining the controlling member out of the path of the actuating member, means tending to move the retaining member to release the controlling member, a latch arranged to normally hold the retaining member in its retaining position, operator-controlled means for releasing the retaining member from the latch, and means arranged to nullify control by the operator upon release of the retaining member.

81. A controlling system comprising a driving member, a driven member, connecting and disconnecting means therefor, a rotatable and bodily movable controlling member for said means, a traveling actuating member for the controlling member, means tending to force the controlling member bodily into the path of the actuating member, a member for normally retaining the controlling member out of the path of the actuating member, means tending to move the retaining member to release the controlling member, a latch arranged to normally hold the retaining member in its retaining position, operator-controlled means for releasing the retaining member from the latch, and means acting in the movement of the controlling member to nullify control by the operator upon release of the retaining member.

82. A controlling system comprising a driving member, a driven member, means for varying the connection between the members, a movable controlling member for the connection-varying means, means tending to force the controlling member into operating position, a movable member for normally retaining the controlling member out of operating position, a latch for said retaining member, and yieldable means arranged to move the latch and free the retaining member.

83. A controlling system comprising a driving member, a driven member, connecting and disconnecting means therefor, a rotatable and bodily movable controlling member for said means, a traveling actuating member for the controlling member, means tending to force the controlling member bodily into the path of the actuating member, a member for normally retaining the controlling member out of the path of the actuating member, means tending to move the retaining member to release the controlling member, a latch arranged to normally hold the retaining member in its retaining position, operator-controlled means for releasing the retaining member from the latch, and means acting upon movement of the controlling member for nullifying control by the operator.

84. A controlling system comprising a driving member, a driven member, means for varying the connection between the members, a movable controlling member for the connection-varying means, means tending to force the controlling member into operating position, a lever fulcrumed to assume positions in which it retains the controlling member out of operating position or releases said controlling member, an oscillatory latch for the lever, and a treadle connected to the latch.

85. A controlling system comprising a driving member, a driven member, means for varying the connection between the members, a movable controlling member for the connection-varying means, means tending to force the controlling member into operating position, a lever fulcrumed to assume positions in which it retains the controlling member out of operating position or releases said controlling member, an oscillatory latch for the lever, a treadle, and a pivoted detent connecting the treadle and latch.

86. A controlling system comprising a driving member, a driven member, means for varying the connection between the members, a movable controlling member for the connection-varying means, a spring-pressed lever acting to force the controlling member into operating position, a lever fulcrumed to assume positions in which it retains the controlling member out of operating position or releases said controlling member, an oscillatory latch for the retaining lever, a treadle, a pivoted detent connecting the treadle and latch, and means movable with the spring-pressed lever and contacting with the detent to free the latch from the treadle.

87. A speed-controlling system comprising a driving member, a driven member, connection-varying means between the members, apparatus controlling the connection-varying means and including elements movable into different relations, means arranged to initiate the operation of the apparatus, and means for preventing action of the initiating means except when the elements are in a predetermined relation.

88. A speed-controlling system comprising a driving member, a driven member, connection-varying means between the members, apparatus controlling the connection-varying means and including gearing movable into different relations, means for normally retaining the gearing against movement, said means being movable to release the gearing, and means for holding the retaining means against movement at predetermined times.

89. A speed-controlling system comprising a driving member, a driven member, connection-varying means between the members, apparatus controlling the connection-varying means and including gearing movable into different relations, means for normally retaining the gearing against movement, said means being movable to release the gearing, and means for holding the retaining means against movement at predetermined times, said retaining means including relatively yieldable sections with which the gearing and holding means respectively co-operate.

90. A speed-controlling system comprising a driving member, a driven member, connection-varying means between the members, apparatus controlling the connection-varying means and including gearing movable into different relations, means for normally retaining the gearing against movement, said means being movable to release the gearing, rotatable means for holding the retaining means against movement at predetermined times, and means for separating the holding means and retaining means while the latter is in its retaining position.

91. A speed-changing system comprising a driving shaft, a driven shaft, connection-varying means between the shafts, apparatus operable from the driving shaft for controlling the connection-varying means, and means actuated by the driving shaft for modifying the time of action of the controlling apparatus.

92. A speed-changing system comprising a driving shaft, a driven shaft, connection-varying means between the shafts, apparatus for controlling the connection-varying means and including a Geneva gear, a projection revoluble by the driving shaft for rotating the Geneva gear, means arranged to initiate the action of the controlling mechanism, and a cam rotatable by the driving shaft and governing the action of the initiating means.

93. A speed-changing system comprising a driving shaft, a driven shaft, connection-varying means between the shafts, apparatus for controlling the connection-varying means and including a Geneva gear having a contact member movable therewith, a projection revoluble by the driving shaft for rotating the Geneva gear, a lever movable into and out of the path of the contact member, and a cam rotatable by the driving shaft and arranged to limit the movement of the lever.

94. A speed-changing system comprising a driving shaft, a driven shaft, connection-varying means between the shafts, apparatus for controlling the connection-varying means and including a member operable from the driving shaft and a contact member movable therewith, a lever movable into and out of the path of the contact member, and a cam rotatable by the driving shaft, the lever having relatively yieldable sections one of which is engaged by the contact member and the other of which contacts with the cam.

95. A speed-changing system comprising a driving shaft, a driven shaft, connection-varying means between the shafts, apparatus for controlling the connection-varying means and including a Geneva gear having a contact member movable therewith, a projection revoluble by the driving shaft for rotating the Geneva gear, a lever movable into and out of the path of the contact member, a cam rotatable by the driving shaft and arranged to limit the movement of the lever, and a latch for the lever, said latch and lever co-operating to separate the lever from the cam.

96. A speed-changing system comprising a driving shaft, a driven shaft, connection-varying means between the shafts, apparatus for controlling the connection-varying means and including a Geneva gear having a contact member movable therewith, a projection revoluble by the driving shaft for rotating the Geneva gear, a retaining lever movable into and out of the path of the contact member, a cam rotatable by the driving shaft and arranged to limit the movement of the lever, and a latch for the lever, said latch and lever being provided with cam-surfaces contacting to separate the lever in its retaining position from the cam.

97. A controlling system comprising a driving member, a driven member, connection-varying means between the members, apparatus controlling the connection-varying means and being actuated by the driving member, means made effective in the operation of the controlling apparatus for stopping its action, and means for completing the stopping of the controlling apparatus independently of its operation.

98. A controlling system comprising a driving member, a driven member, connection-varying means, apparatus controlling the connection-varying means and including a rotatable gear movable into and out of co-operation with the driving member, contact means acting in the rotation of the gear for moving it away from the driving member, and means made effective in the action of the contact means for completing movement of the gear.

99. A controlling system comprising a driving member, a driven member, connection-varying means, apparatus controlling the connection-varying means and including a rotatable gear movable into and out of co-operation with the driving member, a contact member rotatable with the gear, a spring interposed between the gear and contact member, and a cam acting upon the contact member to move the gear out of co-operation with the driving member and to compress the spring.

100. A speed-changing system comprising a driving shaft, a projection revoluble by the driving shaft, a driven shaft, connection-varying means between the shafts, apparatus controlling the connection-varying means and including a Geneva gear movable bodily into and out of the path of the projection, a contact member rotatable with the Geneva gear, said contact member and gear being arranged for relative movement toward and from each other, a spring interposed between the contact member and gear and capable of compression and expansion in the relative movement, and a cam acting upon the contact member to move the gear away from the projection.

101. A speed-changing system comprising a driving shaft, a driven shaft, connection-varying means between the shafts, apparatus controlling the connection-varying means and including a member movable into and out of co-operation with the driving shaft for rotation thereby, means producing movement of the controlling member at predetermined times, and means for preventing such movement at other times.

102. A speed-changing system comprising a driving shaft, a member revoluble by the driving shaft, a driven shaft, connection-varying means between the shafts, apparatus controlling the connection-varying means and including a rotatable member movable into and out of co-operation with the driving member for rotation thereby, contact means including a member rotatable with the controlling member and a member which said rotatable member engages, said contact means being arranged to move the controlling member from co-operation with the driving member at predetermined times, and means for preventing such movement at other times.

103. A speed-changing system comprising a driving shaft, a projection revoluble by the driving shaft, a driven shaft, connection-varying means between the shafts, apparatus controlling the connection-varying means and including a gear movable bodily into and out of the path of the projection, a contact member movable with the gear, and a plurality of relatively fixed contact members which said rotatable contact members engage, one of said contact members being arranged to move the gear away from the projection and the other arranged to prevent such movement.

104. A speed-changing system comprising a driving shaft, a projection revoluble by the driving shaft, a driven shaft, connection-varying means between the shafts, apparatus controlling the connection-varying means and including a Geneva gear movable bodily into and out of the path of the projection, a contact member rotatable with the Geneva gear, a spring acting to force the Geneva gear into the path of the projection, and means engaging the contact member at predetermined times in the rotation of the gear and arranged to prevent movement of the gear in a direction opposite to that produced by the spring.

105. A speed-changing system comprising a driving shaft, a projection revoluble by the driving shaft, a driven shaft, connection-varying means between the shafts, apparatus controlling the connection-varying means and including a rotatable member movable into and out of co-operation with the driving member for rotation thereby, contact means including a member rotatable with the controlling member and a member which said rotatable member engages, said contact means being arranged to move the controlling member from co-operation with the driving member at predetermined times, and means constructed and arranged to prevent such movement at other times and to produce movement of the controlling member in the opposite direction.

106. A speed-changing system comprising a driving shaft, a member movable by the driving shaft, a driven shaft, connection-varying means between the shafts, apparatus controlling the connection-varying means and including a member movable bodily into and out of the path of the driving member, a contact member rotatable with the controlling member, a spring acting to force the controlling member into the path of the driving member, and a cam engaging the contact member to assist the spring in moving the controlling member.

107. A speed-changing system comprising a driving shaft, a projection revoluble by the driving shaft, a driven shaft, connection-varying means between the shafts, apparatus controlling the connection-varying means and including a Geneva gear movable bodily into and out of the path of the projection, a spring acting to force the Geneva gear into the path of the projection, and a plurality of cams co-operating with the spring to move the gear.

108. A speed-changing system comprising a driving shaft, a projection revoluble by the driving shaft, a driven shaft, connection-varying means between the shafts, apparatus controlling the connection-varying means and including a Geneva gear movable bodily into and out of the path of the projection, a contact member rotatable with the Geneva gear, a spring acting to force the Geneva gear into the path of the projection, a cam acting upon the contact member to move the gear out of the path of the projection, and a cam arranged to assist the spring to move the gear and to prevent opposite movement at times other than during the action of the previously-mentioned cam.

In testimony whereof I have signed my name to this specification.

GARRETT P. S. CROSS.